United States Patent [19]

Van Kanegan

[11] Patent Number: 4,598,546

[45] Date of Patent: Jul. 8, 1986

[54] WIDE RANGE ROTARY GEAR HYDROSTATIC TRANSMISSION

[76] Inventor: Eugene M. Van Kanegan, 802 S. Hawthorne, Elmhurst, Ill. 60126

[21] Appl. No.: 456,863

[22] Filed: Feb. 18, 1983

[51] Int. Cl.$^4$ ............................................. F16D 39/00
[52] U.S. Cl. ..................................................... 60/491
[58] Field of Search .................. 60/491, 490, 487; 418/21, 171

[56] References Cited

U.S. PATENT DOCUMENTS

| 1,603,395 | 10/1926 | Mohl | 418/171 |
|---|---|---|---|
| 1,990,750 | 2/1935 | Pigott | 418/21 |
| 2,052,419 | 8/1936 | Moore et al. | 418/21 |
| 2,463,950 | 3/1949 | Carroll | 60/491 X |
| 3,224,198 | 12/1965 | Schimkat | 60/491 X |
| 3,383,931 | 5/1968 | Patterson, Jr. | 418/61 B |
| 3,740,954 | 6/1973 | Young | 60/491 X |

FOREIGN PATENT DOCUMENTS

| 511495 | 10/1930 | Fed. Rep. of Germany | 60/490 |
|---|---|---|---|
| 861773 | 1/1953 | Fed. Rep. of Germany | 60/487 |
| 859793 | 1/1961 | United Kingdom | 418/21 |
| 1454784 | 11/1976 | United Kingdom | 418/21 |

*Primary Examiner*—Edward N. Look

[57] ABSTRACT

A transmission device for mechanical power having continuously variable drive ratio and the capability for a wide ratio range is inherently simple in mechanical construction thru use of a rotary gear pump which hydraulically drives a rotary gear motor. Pump and motor are variable in displacement and a construction is taught which axially positions the pump and motor elements so their displacements are adjusted in opposite volumetric directions when effecting a drive ratio adjustment, thereby providing a wide range in possible drive ratios and still maintaining simplicity.

1 Claim, 8 Drawing Figures

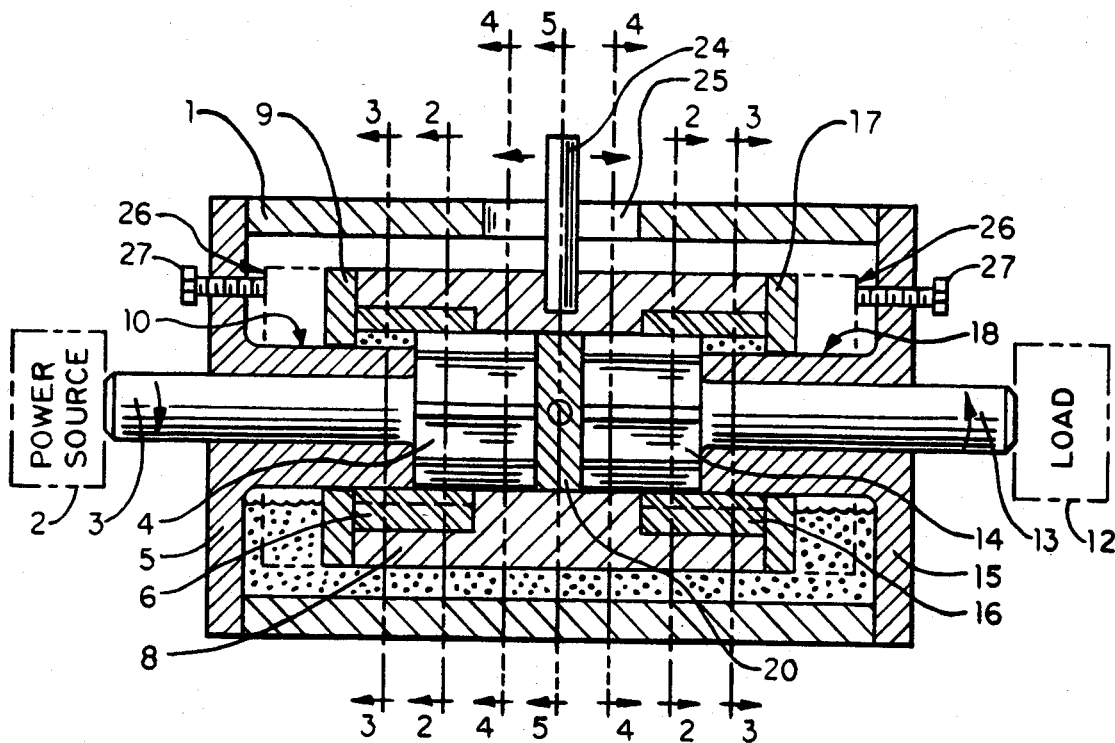
FIG.1
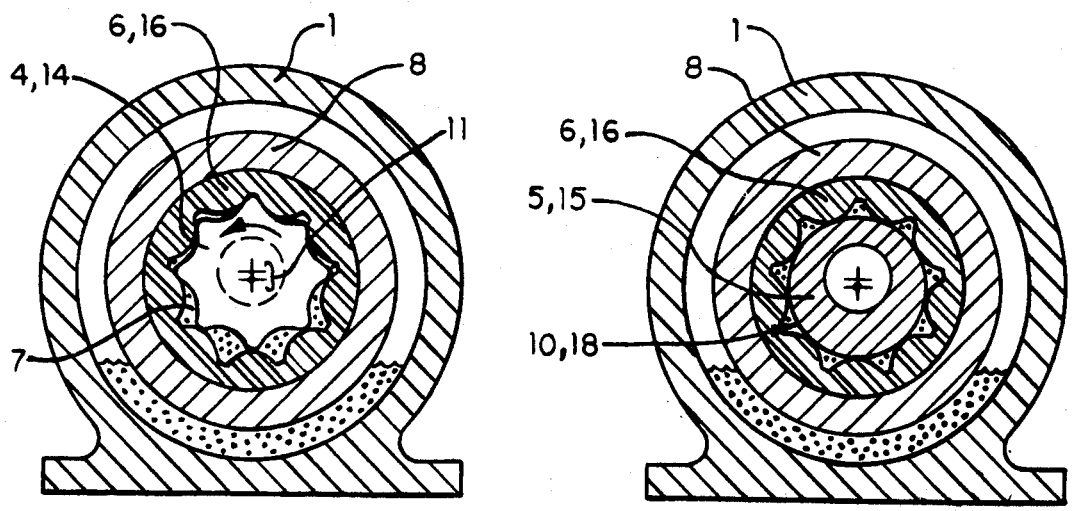
FIG.2
FIG.3

WIDE RANGE ROTARY GEAR HYDROSTATIC TRANSMISSION

BACKGROUND OF THE INVENTION

The field of the invention is in a transmission device for mechanical power which has a continuously variable drive ratio. It transmits power from an input shaft at one torque and rotational speed to an output shaft at another torque and rotational speed. The ratio of input to output speeds or torques is continuously adjustable to provide any ratio in a range within limits determined by the transmission device's design.

Commercially available hydrostatic transmission devices, where typically a positive displacement variable output pump hydraulically drives a positive displacement motor, are, in many respects, superior to other approaches to variable ratio transmission such as commonly used traction drives or belt drives with variable sheave diameter. The hydrostatic transmission devices can provide a reliable positive drive with a wide drive ratio range. A major drawback, however, which has limited the application of hydrostatic transmission devices, has been their mechanical complexity and the resulting high manufacturing cost.

It is a primary object of the invention to provide a continuously variable hydrostatic mechanical power transmission device which is simple in mechanical construction.

A further object of the invention is to provide a continuously variable hydrostatic mechanical power transmission device with a wide drive ratio range.

Still further objects will become apparent upon referring to a detailed description of a preferred embodiment and the attached drawings.

The invention utilizes the variable delivery gear pump concept disclosed in U.S. Pat. No. 2,052,419 which teaches that the fluid displacement per drive gear revolution of a gear pump can be varied by the axial moving of one gear relative to the other which changes the axial length of the meshing engagement and therefore the displacement. The displacement is proportional to the axial length of the meshing engagement.

SUMMARY OF THE INVENTION

According to the present invention, the wide range hydrostatic transmission device contains a variable displacement rotary gear pump which hydraulically drives a variable displacement rotary gear motor. The pump and motor each contain a drive gear, which is attached to a transmission input power shaft in the case of the pump and an output power shaft in the case of the motor. Each also contains an idler gear which is axially movable to provide variable displacement. The use of a variable displacement rotary gear pump and a variable displacement rotary gear motor contributes to the objective of simplicity since, other than the hydraulic fluid itself, there are essentially only four moving elements involved in the transmission of power.

Further for additional construction simplicity, a single housing is used for both pump and motor, the two idler gears are connected by a common adjustment means, and the pump drive gear, pump idler gear, motor idler gear and motor drive gear are axially positioned relative to each other such that an adjustment of the axial location of the idler gears causes the displacement of the pump and motor to be adjusted simultaneously and in opposite volumetric directions.

It is thereby possible to adjust the pump and motor thru a range from minimum pump displacement with maximum motor displacement to maximum pump displacement with minimum motor displacement. This effects a multiplication of the individual minimum to maximum displacement ratios of pump and motor, providing a wide range in transmission speed or torque ratios.

BRIEF DESCRIPTION OF THE DRAWINGS

Drawings of a preferred embodiment of the invention are included so that the invention may be better and more fully understood, in which:

FIG. 1 is a cross sectional view, taken thru the vertical centerline of the transmission device.

FIG. 2 is a cross sectional view, taken along line 2—2 of FIG. 1, showing the active displacement sections of pump or motor.

FIG. 3 is a cross sectional view, taken along line 3—3 of FIG. 1, showing the inactive idler gear section of pump or motor.

DESCRIPTION OF A PREFERRED EMBODIMENT

Figure 4:
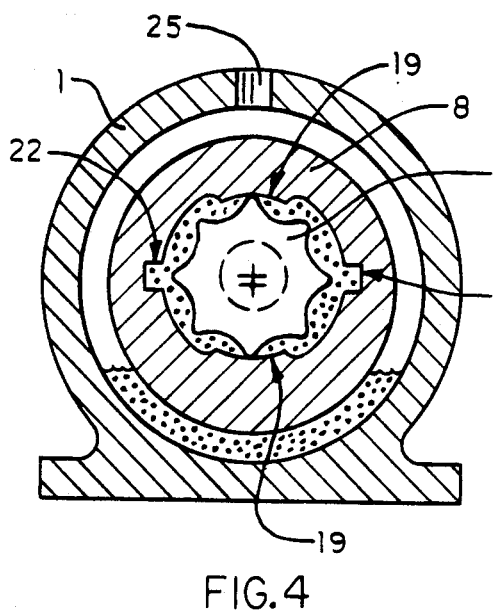
FIG. 4 is a cross sectional view, taken along line 4—4 of FIG. 1, showing the inactive drive gear section of pump or motor.

In FIG. 1 of the drawings, the numeral 1 designates a single housing for the transmission device which contains the apparatus of both a rotary gear pump and a rotary gear motor. Referring to the pump section in the left half of the figure, a mechanical power source 2 such as an electric motor or gasoline engine drives input drive shaft 3 which has pump drive gear 4 (shown as unsectioned) rigidly secured thereto. Housing end plate 5 is affixed to housing 1 and supports the rotation of the input drive shaft 3 and prevents any leftward movement of pump drive gear 4. Pump drive gear 4 is shown in partial axial meshing engagement with pump idler gear 6.

FIG. 2 better shows this active fluid displacement section with the meshing engagement. The drive gear 4 and idler gear 6 in this embodiment are of the positive displacement rotary internal gear pump configuration known as a gerotor. FIG. 2 illustrates the fluid displacement method of this form of rotary gear pump. Drive gear 4 is an externally toothed gear having one less tooth than internally toothed idler gear 6. The center of rotation of drive gear 4 is eccentrically raised (designated as 11) relative to the center of rotation of idler gear 6 so that the conjugately generated tooth profiles maintain continuous fluid tight contact during operation, creating a series of alternately expanding and contracting chambers such as the one designated by the numeral 7. With proper porting (to be later described) this provides the positive fluid displacement required. The hydraulic fluid in all of the figures is represented as dotted. In the case of the pump, referring to FIG. 2, with counter clockwise rotation of the pump elements 4 and 6, the volumetrically expanding fluid chambers on the left half of the figure will provide fluid suction while the contracting chambers on the right half will provide fluid pressure to be directed to the transmission device's rotary gear motor.

It should be appreciated that other forms of rotary gear fluid displacement pumps and motors can also be used such as internal gear pumps featuring a sealing cresent separating the internally toothed and externally toothed gears and gear-on-gear devices where both gears are externally toothed.

In this embodiment using a gerotor configuration, the rotation of idler gear 6 is radially contained in a non-rotating adjustment sleeve 8. FIG. 1 shows that a shoulder in adjustment sleeve 8 and a sleeve end plate 9, which is affixed to sleeve 8, prevent idler gear 6 from significant axial movement relative to adjustment sleeve 8. Sleeve and plate 9 has a bore which is concentric with idler gear 6 and can slide axially to the left or right, bearing on cylindrical surface 10 of housing end plate 5. This then provides support for the left end of adjustment sleeve 8. The bore in housing end plate 5 for input drive shaft 3 is eccentrically raised relative to cylindrical surface 10 to provide the eccentricity 11 (of FIG. 2) required between drive gear 4 and idler gear 6.

In this embodiment, all of the above mentioned elements are repeated with similar elements in the right half of FIG. 1 for the motor section of the transmission device. This includes output drive shaft 13 which has motor drive gear 14 (shown as unsectioned) rigidly secured thereto and is eccentrically supported in housing end plate 15. Motor idler gear 16 is shown in partial axial meshing engagement with motor drive gear 14 and is radially contained in adjustment sleeve 8 and prevented from significant axial movement relative to adjustment sleeve 8 by a shoulder in adjustment sleeve 8 and sleeve end plate 17. Sleeve end plate 17 provides support for the right end of adjustment sleeve 8 by being bored for bearing on cylindrical surface 18 of housing end plate 15. Again as with the pump section, sleeve end plate 17 can slide axially to the left or right on cylindrical surface 18.

This ability of sleeve end plates 9 and 17 to slide axially relative to housing 1, housing end plates 5 and 15, and most importantly drive gears 4 and 14, allows the entire adjustment sleeve assembly comprising sleeve end plates 9 and 17, adjustment sleeve 8, and most importantly idler gears 6 and 16, to be axially moved to effect a drive ratio change by simultaneously changing the axial length of meshing engagement and thus the displacement of both pump gears 4 and 6 and motor gears 14 and 16.

Due to the symmetry of this embodiment, FIG. 2 also represents a cross section thru the active displacement section of motor gears 14 and 16. Hydraulic fluid under pressure from the pump is admitted into the fluid chambers on the left half of the figure, causing them to expand thru counter clockwise rotation of motor gears 14 and 16. Fluid chambers on the right half of the figure are contracting to expel fluid at essentially no pressure for transfer to the suction side of the pump. The forced rotation of motor drive gear 14 provides output power thru output drive shaft 13 to drive a mechanical load represented by the numeral 12 of FIG. 1.

Sealing between the pressure and no pressure sides in the inactive sections of both pump and motor must be accomplished to prevent power loss due to fluid pressure loss.

FIG. 3, representing sections 3—3 thru the inactive idler gear section of either pump or motor, shows that cylindrical surface 10 or 18 of housing end plates 5 or 15 can be made to be close fitting to the inside diameter of internally toothed idler gears 6 or 16 thus serving to prevent passage of fluid from tooth space to tooth space and leakage of pressure between the pressure and no pressure sides.

Similarly FIG. 4, representing sections 4—4 thru the inactive drive gear section of either pump or motor, shows that prevention of pressure leakage from pressure side to no pressure side can be accomplished by making the innermost diameter of adjustment sleeve 8 to be close fitting to the outside diameter of the externally toothed drive gears 4 or 14. Sections of this close fitting diameter can be seen directly above and below drive gear 4 or 14 and are noted by the numeral 19. The arc of each of these close fitting sections 19 should be equal to or greater than the arc of one tooth space measured on the outer diameter of drive gear 4 or 14.

Sealing means for other forms of variable displacement rotary gear pumps and motors can be understood by referring to U.S. Pat. No. 2,052,419.

In this embodiment using a gerotor configuration, referring to FIG. 1, the passage of fluid between pump and motor and return might be accomplished by having the right side of pump drive gear 4 run directly against the left side of motor drive gear 14. This provides for direct passage of pressurized fluid from the contracting chambers of the gear pump into the expanding chambers of the gear motor and similar fluid transfer on the no pressure side. It is possible under that approach, however, to have a fluid pressure leakage path when using tooth forms of the gearotor type shown in the figures. This is a serpentine path which winds its way back and forth between the tooth spaces of pump drive gear 4 and motor drive gear 14 connecting the pressure side with the no pressure side. To prevent this leakage, this embodiment uses a port plate 20 which is positioned between pump drive gear 4 and motor drive gear 14.

Figure 5:
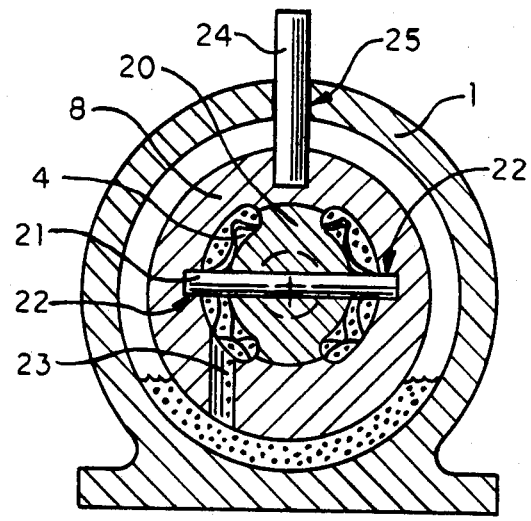
FIG. 5 is a cross sectional view, taken along line 5—5 of FIG. 1, showing porting means for fluid passage between pump and motor.

FIG. 5, representing section 5—5 thru port plate 20, shows that the outer most diameter of port plate 20 is close fitting with the innermost diameter of adjustment sleeve 8. Sections of port plate 20 are relieved to a diameter approximating the tooth root diameter of externally toothed drive gears 4 or 14 to allow passage of fluid from pump to motor and return. To prevent pressure leakage, the arc of each of the remaining close fitting sections, shown near the top and bottom of drive gear 4, should be approximately equal to the arc of one tooth space measured on the outer diameter of drive gear 4 or 14.

Port plate 20 has a sliding fit inside adjustment sleeve 8. Locator pin 21 is pressed into and thru the center of port plate 20 and restrains port plate 20 from rotation, pin 21 being confined in two slots in adjustment sleeve 8 designated by the numeral 22 (see FIG. 4 also). Locator pin 21 also serves to prevent side to side dislocation of port plate 20.

Additional fluid flow port area between pump and motor can be provided as shown by relieving sections of adjustment sleeve 8 leaving sections 19 (see FIG. 4) to prevent pressure leakage.

While the working fluid with such positive displacement rotary gear pumps and motors could be a gas, it is more efficient and more common to use a liquid which is essentially noncompressible such as an oil and this embodiment should be understood to use a liquid. FIG.

5 shows drilled hole 23 thru adjustment sleeve 8 which provides fluid passage path to the suction side of the pump from a fluid reservoir between adjustment sleeve 8 and housing 1. This provides for fluid filling of pump and motor when considered with air escapement from the pressure side of the device thru naturally occurring pressure leakage paths due to required manufacturing clearances or leakage means which can be added for the purpose of bleeding off the air.

FIG. 5 also shows ratio adjustment pin 24 which serves a dual purpose in this embodiment. First, it is pressed into adjustment sleeve 8 and rides in slot 25 of housing 1 (better seen in FIG. 4 and FIG. 1). This prevents axial rotation of the adjustment sleeve assembly. The second purpose of ratio adjustment pin 24 is to represent means for adjustment of the axial position of the adjustment sleeve assembly. With pin 24 a manual adjustment can be made from outside of housing 1. The total range of axial movement of the sleeve assembly is shown by phantom lines noted as numeral 26 in FIG. 1.

In FIG. 1 the adjustment sleeve assembly is shown in the center of its range with the axial length of meshing engagement between pump gears 4 and 6 being equal to that of motor gears 14 and 16. Under that condition the displacement of pump and motor are the same and therefore the transmission device's input to output drive shaft speed ratio is 1:1. As the adjustment sleeve assembly is axially moved to the left, the axial length of meshing engagement of pump gears 4 and 6 becomes less as the axial length of meshing engagement of motor gears 14 and 16 becomes greater. If we stop the leftward axial movement at a position where the mesh length of the pump is one-tenth of the mesh length of the motor, the pump to motor displacement ratio is 1:10 and thus the input to output drive shaft speed ratio will be 10:1.

Figure 6:
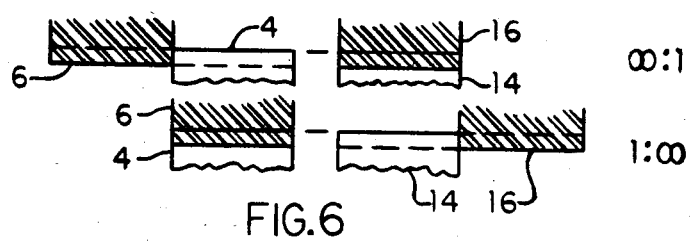
FIGS. 6 thru 8 are schematic examples of axial positioning possibilities for the meshing engagement of drive gears and idler gears to provide desired drive ratio ranges.
Figure 7:
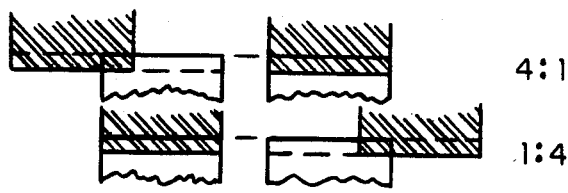
Figure 8:
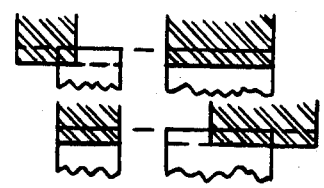

FIGS. 6 thru 8 are schematics which represent only the toothed meshing engagement areas of the four pump and motor gears. Referring to FIG. 6 as an example, in all schematics pump drive gear 4 and motor drive gear 14 are shown as the lower gears and pump idler gear 6 and motor idler gear 16 are shown as the upper gears with the pump on the left and motor on the right. There is a pair of schematics in each figure, the upper one representing the adjustment sleeve assembly with its idler gears shifted to the left limit and the lower one showing the idler gears shifted to the right limit while the drive gears remain stationary. In all pairs of schematics the drive gears maintain the same spacing relative to each other and the idler gears maintain the same spacing relative to each other, just as they do in the embodiment of FIG. 1. Input to output drive shaft speed ratios are noted to the side of each schematic.

FIG. 6 represents the same axial positioning as found in FIG. 1. The ratio range limits occur just as an idler gear is about to totally leave meshing engagement with its drive gear. At that point the input to output speed ratio is approaching infinity:1 when the adjustment sleeve assembly is shifted left as in the upper schematic and is approaching 1:infinity when shifted to the right as in the lower schematic. In principle then, the total drive ratio range resulting from this axial positioning is from infinity:1 to 1:infinity which makes the embodiment not only continuously variable in drive ratio but also truly infinitely variable.

In practice it is not always desirable to allow idler gears to totally disengage from their drive gears because of difficulty in reachieving alignment for meshing when desired. One form of preventing this problem is shown in FIG. 1. Stop position adjustment screws 27 can be provided which allow for adjustment of the maximum ratios and prevention of total disengagement.

Another method for preventing total disengagement and method also for making maximum use of the gear widths in situations where maximum desired ratios are known is illustrated in the schematics of FIG. 7. This particular axial positioning provides input to output drive shaft speed ratios from 4:1 to 1:4. The individual minimum to maximum displacement ratios of pump and motor are multiplied to provide a total speed ratio range of 16:1. Using the upper half of FIG. 1 as a reference, it can be seen that the axial shifting of the adjustment sleeve assembly is limited by the running of a sleeve end plate 9 or 17 against the side of a drive gear 4 or 14, but in the case of FIG. 7, the choice of axial positioning does not allow an idler gear to disengage with its drive gear at that point; one-fourth of the gear widths are still in mesh.

The axial positioning in FIG. 8 illustrates yet another variation to achieve maximum use of gear widths when maximum desired ratios are known. In this case the desired input to output drive shaft speed ratio range was from 7:1 to 1:1. The pump gears are four units wide, the motor gears are seven units wide, and the total axial adjustment range is three units.

In all these examples, the displacements of pump and motor are changed by the same amount simultaneously but in opposite volumetric directions as a ratio adjustment is made. This allows fluid from the decreasing displacement side to be taken up by the increasing displacement side thus assuring prevention of unintended locking of the axial movement of the adjustment sleeve assembly due to trapped fluid, even under conditions when ratio adjustment is made at standstill where the input and output drive shafts are prevented from rotation or should not cause rotation.

The symmetric nature of this embodiment provides for essentially no net axial loading on the adjustment sleeve assembly due to fluid pressure and thus only modest restraint is required to hold a ratio adjustment.

It should be appreciated that the means of adjusting the drive ratio need not be manual by use of a pin protruding from the device's housing. In fact many forms of linkage, lead screw, hydraulic, electro hydraulic, pneumatic or other devices might be used to control and lock adjustment sleeve assembly position and thus drive ratio.

While a preferred embodiment of the invention has been described it should be appreciated that other and further forms of the wide range rotary gear hydrostatic transmission device can be devised without departing from the basic concepts.

Having described my invention, I claim:

1. A continuously variable ratio transmission device for mechanical power comprising a single primary housing containing a rotary gear pump which through fluid displacement drives a rotary gear motor, said pump and motor each having a drive gear in fluid displacement meshing relationship with an idler gear, said pump and motor being hydraulically interconnected by a port plate which is positioned between and adjacent to the innermost sides of the pump and motor drive gears, wherein the pump and motor are of a rotary internal gear pump configuration generally known as a gerotor, said configuration comprising an externally toothed drive gear having one less tooth than an associated internally toothed idler gear, the rotational axis of said idler gear being spaced from the rotational axis of said drive gear so conjugately generated tooth profiles can maintain continuous fluid tight contact to create a series of alternately expanding and contracting chambers wherein the fluid volume displacements of both the pump and motor are variable by axially moving their idler gears relative to their drive gears, wherein the portions of pump and motor gears which are not in active fluid displacement engagement are selaed from fluid leakage between pressure and no pressure sides of the pump and motor through use of cylindrical surfaces which are close fitting to the addendum circle of those inactive portions of the pump and motor gears, the arc of each of said close fitting cylindrical surfaces being equal to or greater than the arc of one tooth space as measured at the addendum circle of its associated gear; the fluid displacements of said pump and motor being varied simultaneously in volumetrically opposite directions by the axial simultaneous movement of their idler gears means for effecting said axial simultaneous movement comprising a stack of elements which includes said pump idler gear, said motor idler gear, two end plates preventing fluid leakage at the outmost sides of the idler gears and an element positioned between and adjacent to the innermost sides of the idler gears preventng fluid leakage at the inner sides of the idler gears, said element being movable with said two end plates and said idler gear.

* * * * *